United States Patent
Ebara et al.

[11] Patent Number: 6,158,281
[45] Date of Patent: *Dec. 12, 2000

[54] VIBRATION GYROSCOPE

[75] Inventors: Kazuhiro Ebara, Toyama; Katsumi Fujimoto, Toyama-ken; Hiroshi Nishiyama, Toyama; Takeshi Nakamura, Uji, all of Japan

[73] Assignee: Murata Manufacturing Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/728,847

[22] Filed: Oct. 10, 1996

[30] Foreign Application Priority Data

Oct. 12, 1995 [JP] Japan ................... 7-291734

[51] Int. Cl.⁷ .................................................. G01P 9/04
[52] U.S. Cl. .................................. 73/504.12; 310/316
[58] Field of Search .......................... 73/504.12, 504.11; 310/316, 317, 318, 319

[56] References Cited

U.S. PATENT DOCUMENTS

| | | | |
|---|---|---|---|
| 5,117,148 | 5/1992 | Nakamura | 73/504.12 X |
| 5,220,833 | 6/1993 | Nakamura | 73/504.12 |
| 5,270,607 | 12/1993 | Terajima | 73/504.12 X |
| 5,336,960 | 8/1994 | Shimizu et al. | 73/504.12 X |
| 5,434,467 | 7/1995 | Abe et al. | 73/504.12 X |
| 5,455,476 | 10/1995 | Nakamura | 73/504.12 X |
| 5,473,288 | 12/1995 | Kumada | 73/504.12 X |
| 5,505,085 | 4/1996 | Kasanami et al. | 310/316 X |

FOREIGN PATENT DOCUMENTS

| | | | |
|---|---|---|---|
| 2-266214 | 10/1990 | Japan | 73/504.12 |
| 6-42972 | 2/1994 | Japan | 73/504.12 |
| 6-50761 | 2/1994 | Japan | 73/504.12 |

*Primary Examiner*—Max Noori
*Attorney, Agent, or Firm*—Ostrolenk, Faber, Gerb & Soffen, LLP

[57] ABSTRACT

A vibration gyroscope 10 includes a vibrator 12. The vibrator 12 has a vibration member 14 formed in a regular triangular prism shape. On side faces of the vibration member 14, piezoelectric elements 16a, 16b and 16c are formed. Two of the piezoelectric elements 16a and 16b are connected to resistors 26 and 28, respectively. Between the other feedback piezoelectric element 16c and these resistors, an oscillation circuit 30 is connected. A signal having a phase opposite to that of the signal output from the feedback piezoelectric element 16c is input to the vibration member 14 serving as a grounding terminal by a phase inverter 34. The signals output from the two piezoelectric elements 16a and 16b are input to a differential circuit 36. The differential circuit 36 is connected to a synchronous detection circuit 38 and connected to a smoothing circuit 40 and a DC amplifier 42 in series.

27 Claims, 9 Drawing Sheets

OUTPUT SIGNAL
OF PIEZOELECTRIC ELEMENT
16C

SIGNAL INPUT
TO GROUNDING TERMINAL

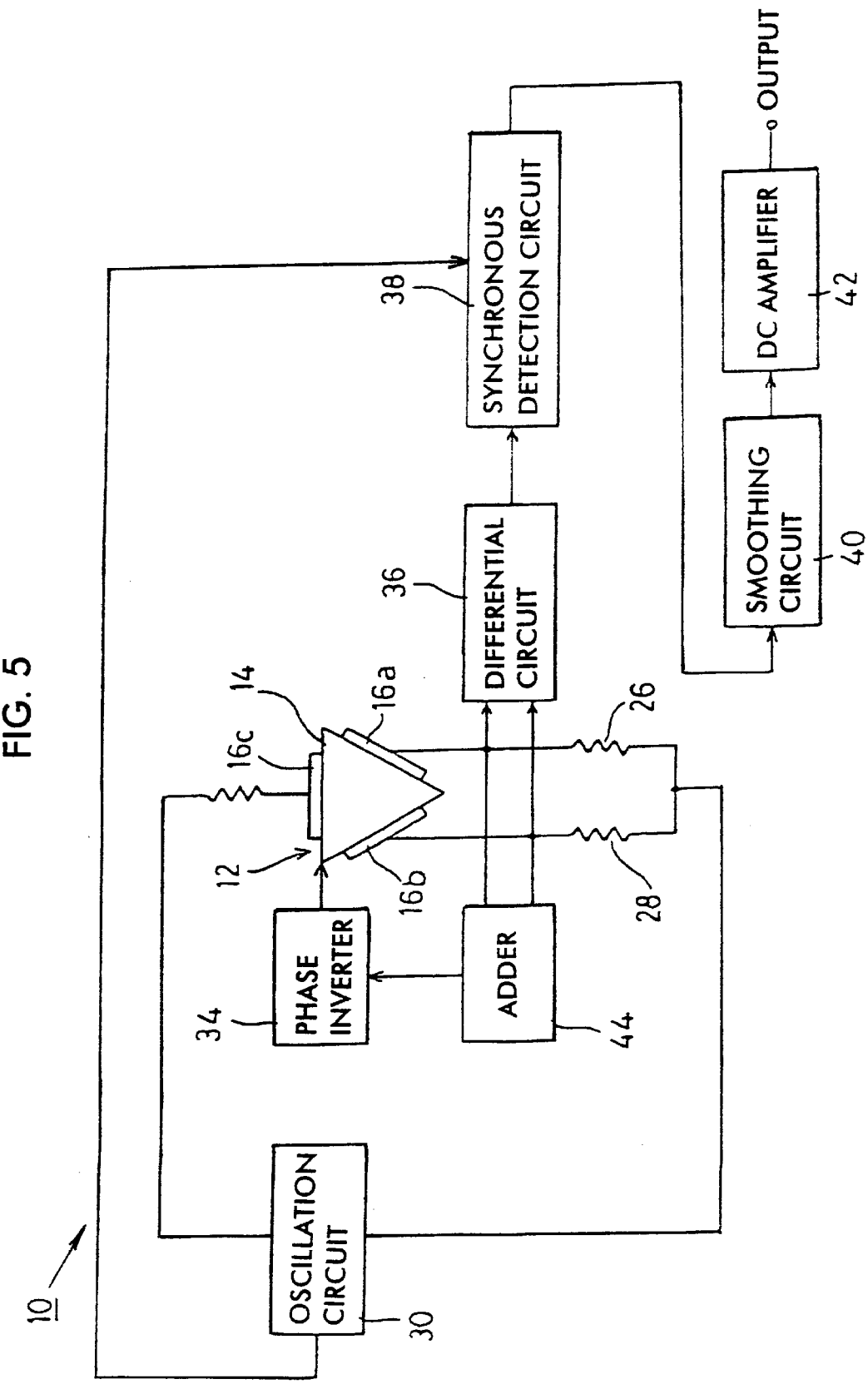

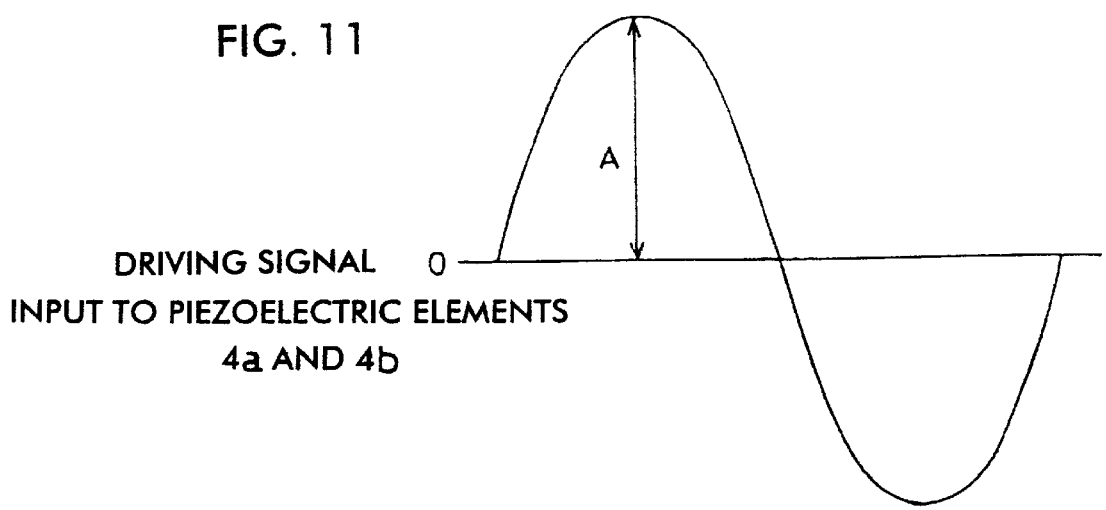

VIBRATION GYROSCOPE

BACKGROUND OF THE INVENTION

1. Field of the Invention

The present invention relates to vibration gyroscopes, and more particularly, to a vibration gyroscope for detecting a rotation angular velocity with the use of bending and vibration of a vibration member.

2. Description of the Related Art

FIG. 10 is a diagram showing an example of a conventional vibration gyroscope. This vibration gyroscope 1 includes a vibrator 2. The vibrator 2 includes a vibration member 3 having, for example, a regular triangular prism shape, as shown in FIG. 10. On the three side faces of the vibration member 3, three piezoelectric elements 4a, 4b, and 4c are formed, respectively. The piezoelectric elements 4a and 4b are used for driving the vibrator 2 to bend and vibrate, and also for detection in order to obtain the signal corresponding to a rotation angular velocity. The piezoelectric element 4c is used in a feedback loop for driving the vibrator 2.

Between the piezoelectric elements 4a and 4b, and the piezoelectric element 4c, an oscillation circuit 5 is connected through resistors. The vibration member 3 is used as a grounding terminal and is connected to a point having half the power voltage. The signals output from the piezoelectric elements 4a and 4b are input to a differential circuit 6. The signal output from the differential circuit 6 is detected by a synchronous detection circuit 7 in synchronization with the signal of the oscillation circuit 5. The signal output from the synchronous detection circuit 7 is smoothed by a smoothing circuit 8 and amplified by a DC amplifier 9.

When the driving signal shown in FIG. 11 is applied to the two piezoelectric elements 4a and 4b in the vibration gyroscope 1, the vibration member 3 bends and vibrates in the direction perpendicular to the surface where the piezoelectric element 4c is formed. When the vibration member 3 rotates about its axis, the direction of vibration of the vibration member 3 changes due to the Coriolis force. Therefore, the signals output from the piezoelectric elements 4a and 4b are different. The signal corresponding to a rotation angular velocity can be obtained by calculating the difference between the signals output from the piezoelectric elements 4a and 4b. The signal output from the differential circuit 6 is detected by the synchronous detection circuit 7, smoothed by the smoothing circuit 8, and amplified by the DC amplifier 9. By measuring this signal, the rotation angular velocity applied to the vibrator 2 can be detected.

Since in such a vibration gyroscope the grounding terminal is connected to a point having half the power voltage, voltage A, which is only half the maximum power voltage, is applied to the piezoelectric elements used for driving, as shown in FIG. 11. Therefore, when a low-voltage power supply such as a dry cell is used, sufficient excitation cannot be applied to the vibration member. If the vibration member is not sufficiently excited, the sensitivity of the vibration gyroscope decreases. As a countermeasure to this problem, a peripheral circuit has conventionally compensated for a decrease in the sensitivity. When this countermeasure is used, vibrator noise and circuit noise are also amplified, and the S/N ratio is reduced.

SUMMARY OF THE INVENTION

Accordingly, it is an object of the present invention to provide a highly sensitive vibration gyroscope in which a vibration member can be sufficiently excited even with a low-voltage power supply.

The foregoing object is achieved through the provision of a vibration gyroscope comprising: a vibration member; driving means and feedback means on the vibration member; a circuit connected between the driving means and the feedback means for applying driving signals to said driving means for vibrating the vibration member, the feedback means providing an output signal; and means for applying a signal having a phase opposite to that of the output signal from the feedback means to a grounding terminal.

In the vibration gyroscope, a signal having a phase opposite that of the signal output from the feedback means may be amplified and then input to the grounding terminal.

The driving means and the feedback means may be formed by piezoelectric elements. In this case, the vibration member is used as the grounding terminal.

The vibration member may be formed by a piezoelectric member. In this case, the driving means, the feedback means, and the grounding terminal are formed on the vibration member as electrodes.

By inputting a signal having a phase opposite to that of the signal output from the feedback means to the grounding terminal, a signal having a large voltage is applied between the feedback means and the grounding terminal, and the vibration member is thereby excited. When the signal output from the feedback means is amplified, the voltage of the signal applied between the feedback means and the grounding terminal is made large.

According to the present invention, since a signal having a large voltage is applied between the feedback means and the grounding terminal, a driving force for bending and vibrating the vibration member is generated also in the feedback means. Therefore, the vibration member is driven by both the driving means and the feedback means, and it can be sufficiently excited even when a low-voltage power supply such as a dry cell is used. The amplitude of the vibration means can be made larger, and a rotation angular velocity can be detected with high sensitivity. Since a signal having a phase opposite to that of the signal output from the feedback means is amplified, the vibrator can be driven with a further large voltage, and the amplitude of the vibration member can be made further large. Therefore, a rotation angular velocity can be detected with further high sensitivity.

The above-described object, other objects, features, and advantages of the present invention will be further clarified by detailed descriptions in the description of the preferred embodiments which will be mentioned below by referring to the drawings.

BRIEF DESCRIPTION OF THE DRAWINGS

FIG. 1A is a diagram showing a modification of the vibration gyroscope shown in FIG. 1.

FIG. 5 is a diagram showing another vibration gyroscope of the present invention.

FIG. 11 is a waveform diagram showing a driving signal input to the vibration gyroscope shown in FIG. 10.

DESCRIPTION OF THE PREFERRED EMBODIMENTS

Figure 1:
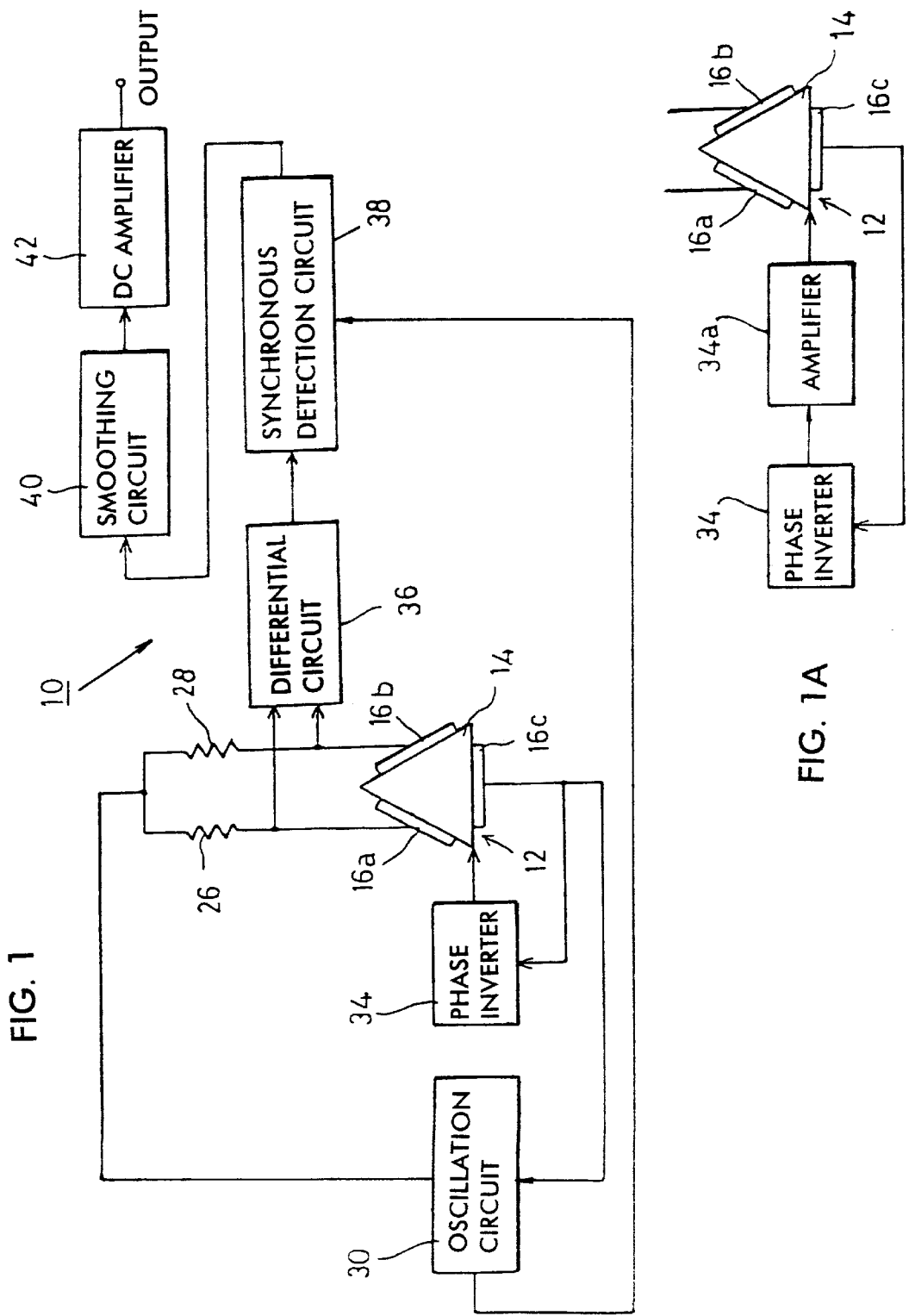
FIG. 1 is a diagram showing a vibration gyroscope of the present invention.
Figure 2:
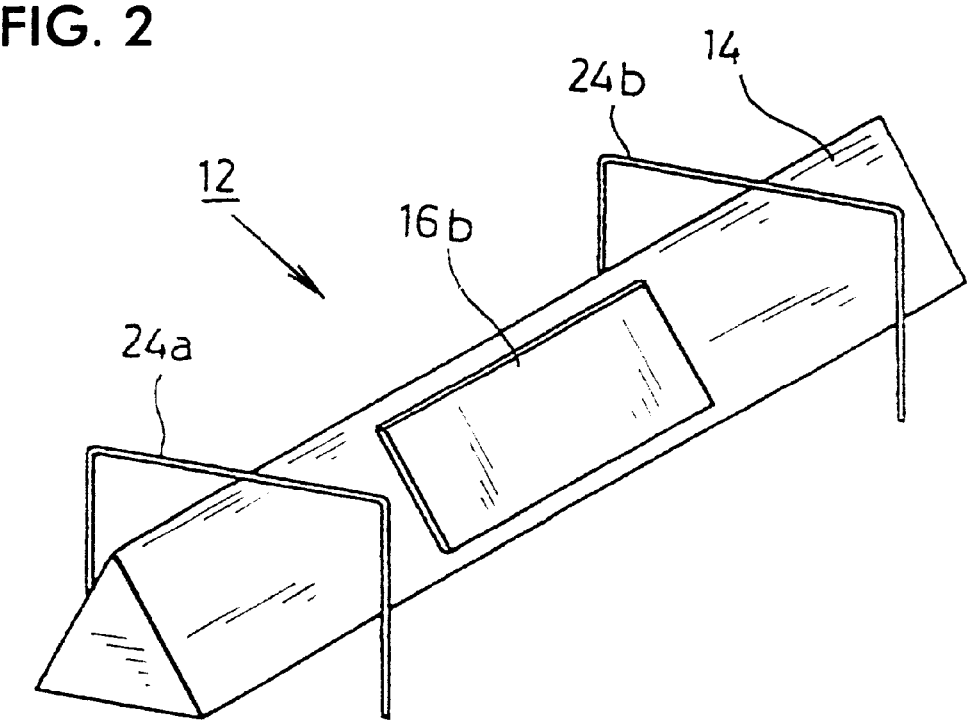
FIG. 2 is a perspective view of a vibrator of the vibration gyroscope shown in FIG. 1.

FIG. 1 is diagram showing an example of a vibration gyroscope according to the present invention. A vibration gyroscope 10 includes a vibrator 12. The vibrator 12 has a vibration member 14 which is formed, for example, in a regular triangular prism shape, as shown in FIG. 2. The vibration member 14 is formed by materials generating mechanical vibration, such as elinvar, an iron-nickel alloy, quartz, glass, crystal, and ceramic.

Figure 3:
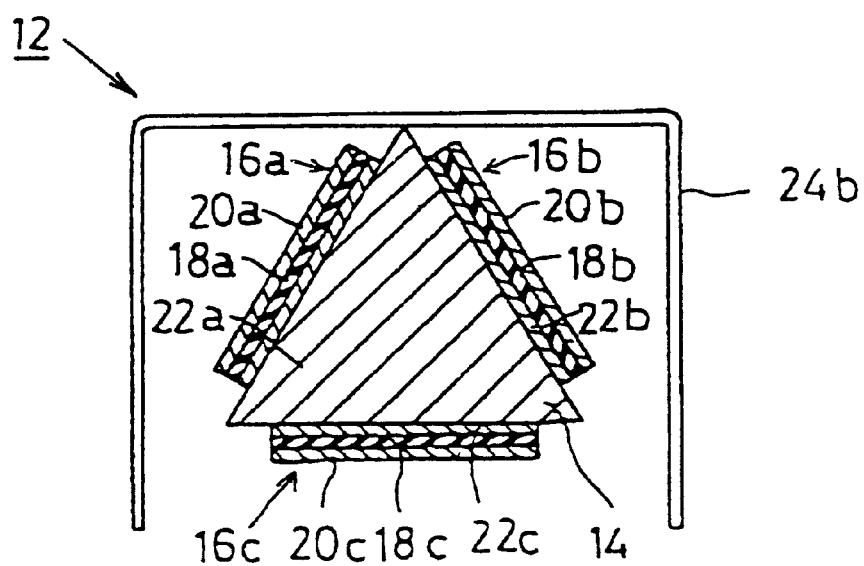
FIG. 3 is a cross section of the vibrator shown in FIG. 2.

On side faces of the vibration member 14, piezoelectric elements 16a, 16b, and 16c are formed. The piezoelectric element 16a includes a piezoelectric plate 18a formed by piezoelectric ceramic or the like, and electrodes 20a and 22a are formed on both surfaces of the piezoelectric plate, as shown in FIG. 3. The electrode 22a is adhered to the vibration member 14. In the same way, the piezoelectric elements 16b and 16c include piezoelectric plates 18b and 18c, and electrodes 20b and 22b, and 20c and 22c are formed on both surfaces of the piezoelectric plates. The electrodes 22b and 22c are stuck to the vibration member 14. The piezoelectric elements 16a and 16b serve as driving means for giving the vibration member 14 bending and vibration and also as detecting means for obtaining the signal corresponding to a rotation angular velocity. The piezoelectric element 16c is used as feedback means which operates when the vibration member 14 bends and vibrates.

On the ridgeline near a node of the vibration member 14, support members 24a and 24b are mounted. The support members 24a and 24b are made of, for example, metal wire formed in a gate shape, i.e., an inverted square U-shape. The support members are secured to a support base at both ends thereof.

The piezoelectric elements 16a and 16b are connected to resistors 26 and 28, respectively. Between the feedback piezoelectric element 16c and these resistors 26 and 28, an oscillation circuit 30 is connected. A phase inverter 34 having its input connected to the feedback piezoelectric element 16c is connected to a grounding terminal of the vibrator 12; accordingly, a signal having a phase opposite to that of the signal output from the feedback piezoelectric element 16c is input to the grounding terminal. The vibration member 14 is used as a grounding terminal and the support members 24a and 24b are, for example, used as signal-input terminals.

The piezoelectric elements 16a and 16b are connected to the input terminals of a differential circuit 36. The signal output from the differential circuit 36 is detected by a synchronous detection circuit 38 in synchronization with, for example, the signal of the oscillation circuit. The synchronous detection circuit 38 is connected to a smoothing circuit 40 and the smoothing circuit 40 is connected to a DC amplifier 42.

Figure 4A:
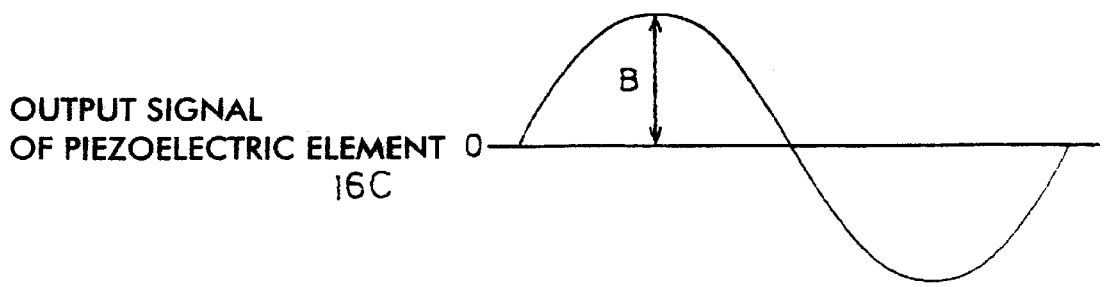
FIGS. 4A and 4B are waveform diagrams showing a feedback signal output from a piezoelectric element 16c and a signal input to a grounding terminal.
Figure 4B:
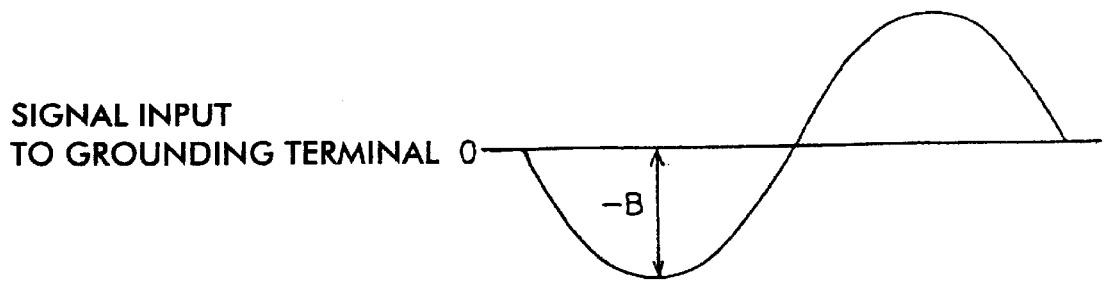

When the driving signal shown in FIG. 11 is applied to the two piezoelectric elements 16a and 16b in the vibration gyroscope 10, the piezoelectric elements 16a and 16b repeat expansion and contraction, and the vibration member 14 bends and vibrates in the direction perpendicular to the surface where the piezoelectric element 16c is formed. A feedback signal is inverted by the phase inversion circuit 34 and a signal having a phase opposite to that of the feedback signal is input to the grounding terminal. Assuming that the feedback signal has the shape shown in FIG. 4A with an amplitude of B, a signal having an amplitude of B and a phase opposite that of the driving signal as shown in FIG. 4B is applied to the vibration member 14. Therefore, a signal having an amplitude of 2B is applied to the piezoelectric element 16c. With this signal, a driving force for bending and vibrating the vibration member 14 is generated in the piezoelectric element 16c, and together with driving forces by the driving piezoelectric elements 16a and 16b, it bends and vibrates the vibration member 14. With these forces, the vibration member 14 bends and vibrates in the direction perpendicular to the surface where the piezoelectric element 16c is formed. In this case, since the signals generated by the piezoelectric elements 16a and 16b have the same phase and the same level, the differential circuit 36 does not output a signal. Therefore, it is found that a rotation angular velocity is not applied to the vibration gyroscope 10.

When the vibration member 14 rotates about its axis in this condition, the direction of vibration of the vibration member 14 changes due to the Coriolis force. Therefore, the signals output from the piezoelectric elements 16a and 16b are different, and the difference is output from the differential circuit 36. This signal corresponds to a rotation angular velocity. The signal output from the differential circuit 36 is detected by the synchronous detection circuit 38 and smoothed by the smoothing circuit 40 to obtain the DC signal corresponding to a rotation angular velocity. This signal is amplified by the DC amplifier 42. By measuring the signal output from the DC amplifier 42, the rotation angular velocity applied to the vibration gyroscope 10 can be detected.

Since the signal having a phase opposite to that of the feedback signal is input to the grounding terminal in the vibration gyroscope 10, a driving force is generated also in the feedback piezoelectric element 16c as well as in the driving piezoelectric elements 16a and 16b. Therefore, even when a low-voltage power supply, such as a dry cell, is used, the vibration member 14 can be sufficiently excited. In other words, the amplitude of the vibration member 14 is made larger than in the conventional vibration gyroscope and the sensitivity in detecting a rotation angular velocity can be improved.

The feedback signal output from the piezoelectric element 16c is amplified by the oscillation circuit 30 and applied to the piezoelectric elements 16a and 16b. The amplitude B of the feedback signal is smaller than the amplitude A of the driving signal. Therefore, the voltage 2B applied to both surfaces of the piezoelectric element 16c is smaller than the maximum power voltage. When the feedback signal is inverted and amplified, however, the maximum power voltage can be applied to both surfaces of the piezoelectric element 16c. The amplitude of bending and vibration of the vibration member 14 can thus be further made larger compared with a case in which the feedback signal is inverted and input to the vibration member 14 without amplification. Advantageously, for this purpose an amplifier 34a may be provided, as shown in FIG. 1A.

In the above-described vibration gyroscope 10, the piezoelectric elements 16a and 16b of the vibrator 12 are used as driving means and detection means, and the piezoelectric element 16c serves as feedback means. As shown in FIG. 5, the vibration gyroscope may be configured such that the piezoelectric elements 16a and 16b serve as detecting means and feedback means and the piezoelectric element 16c is used as driving means. In this case, the signals output from the piezoelectric elements 16a and 16b are combined and fed back to the oscillation circuit 30. The signals output from the piezoelectric elements 16a and 16b are added by an adder 44, inverted in phase, and input to the vibration member 14. Since a signal having a large voltage is applied to the feedback piezoelectric elements 16a and 16b, a driving force for bending and vibrating the vibration member 14 is generated. The amplitude of the bending and vibration of the vibration member 14 can be made large. Therefore, a rotation angular velocity can be detected with high sensitivity.

Figure 6:
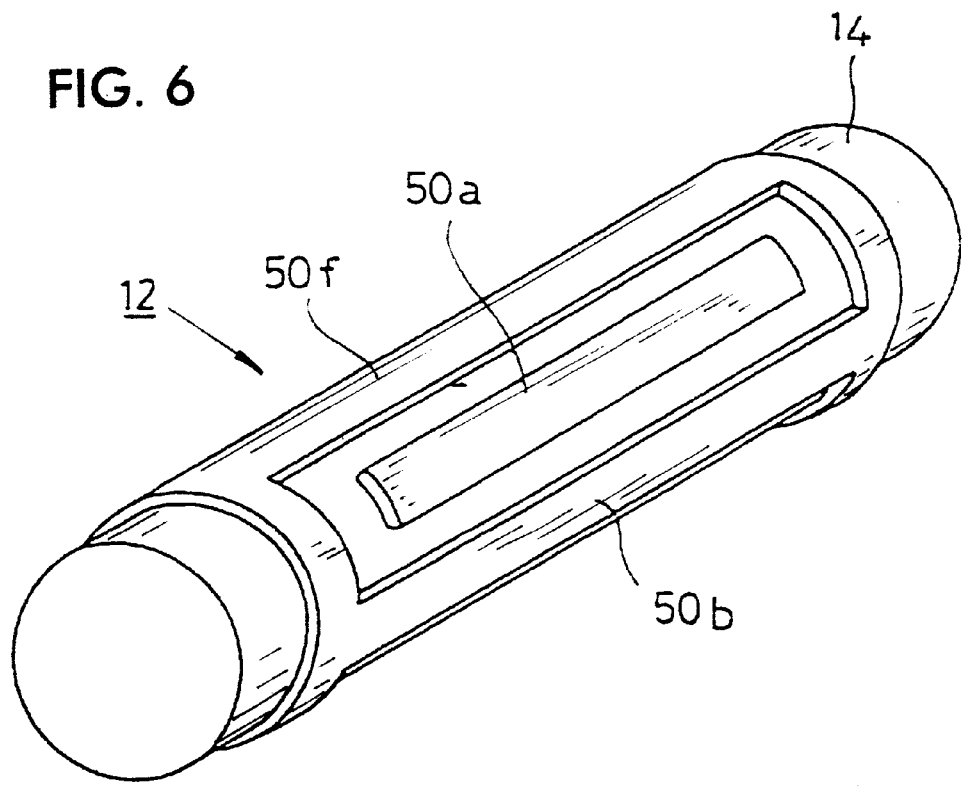
FIG. 6 is a perspective view of another vibrator used in a vibration gyroscope of the present invention.
Figure 7:
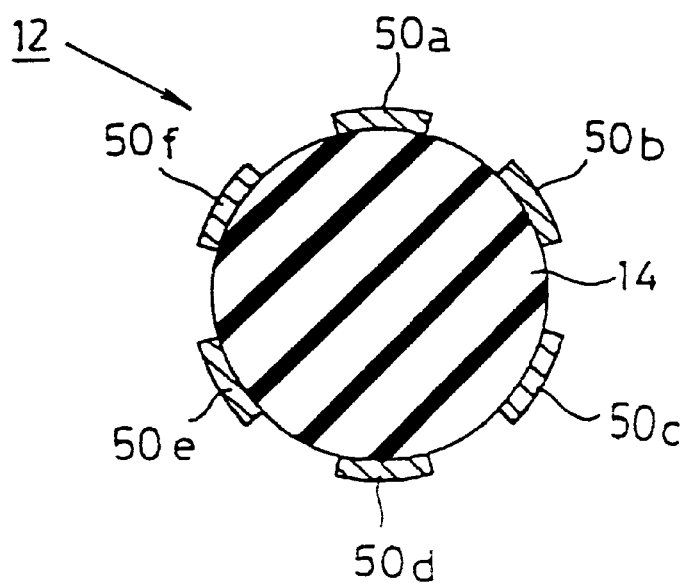
FIG. 7 is a cross section of the vibrator shown in FIG. 6.

The vibrator 12 may use a cylindrical vibration member 14 as shown in FIGS. 6 and 7. The vibration member 14 is made up of a piezoelectric material. On the side face of the vibrator 14, six electrodes 50a, 50b, 50c, 50d, 50e, and 50f are formed. These electrodes 50a to 50f are formed in the longitudinal direction of the vibration member 14. The electrodes 50b, 50d, and 50f, which are disposed alternately on the side face, are connected at both ends and serve as a grounding terminal. Polarization is applied to the vibration member 14 between the electrodes 50a, 50c, and 50e, and the adjacent electrodes (the grounding terminal).

Figure 8:
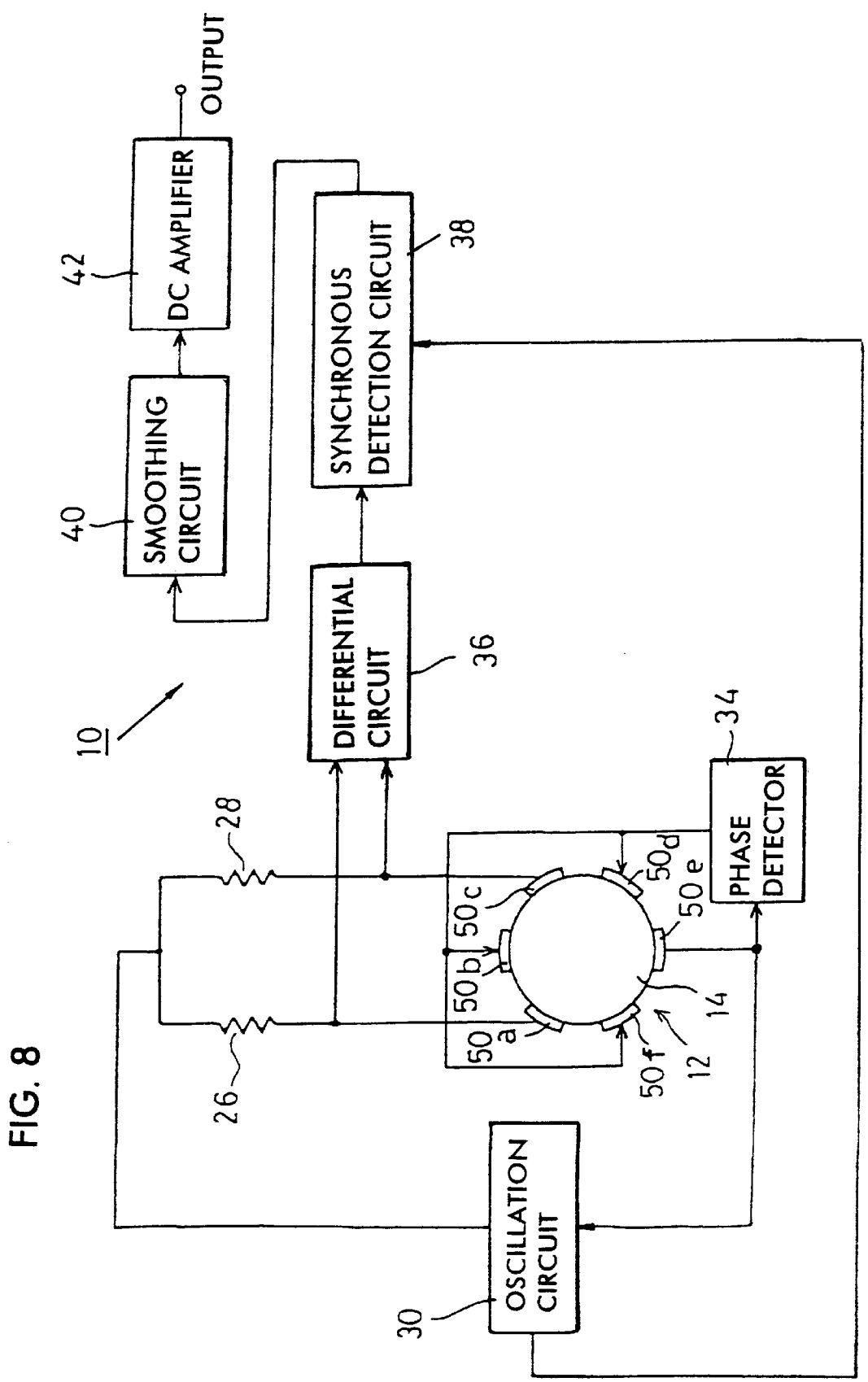
FIG. 8 is a diagram showing a vibration gyroscope using the vibrator shown in FIG. 6.
Figure 9:
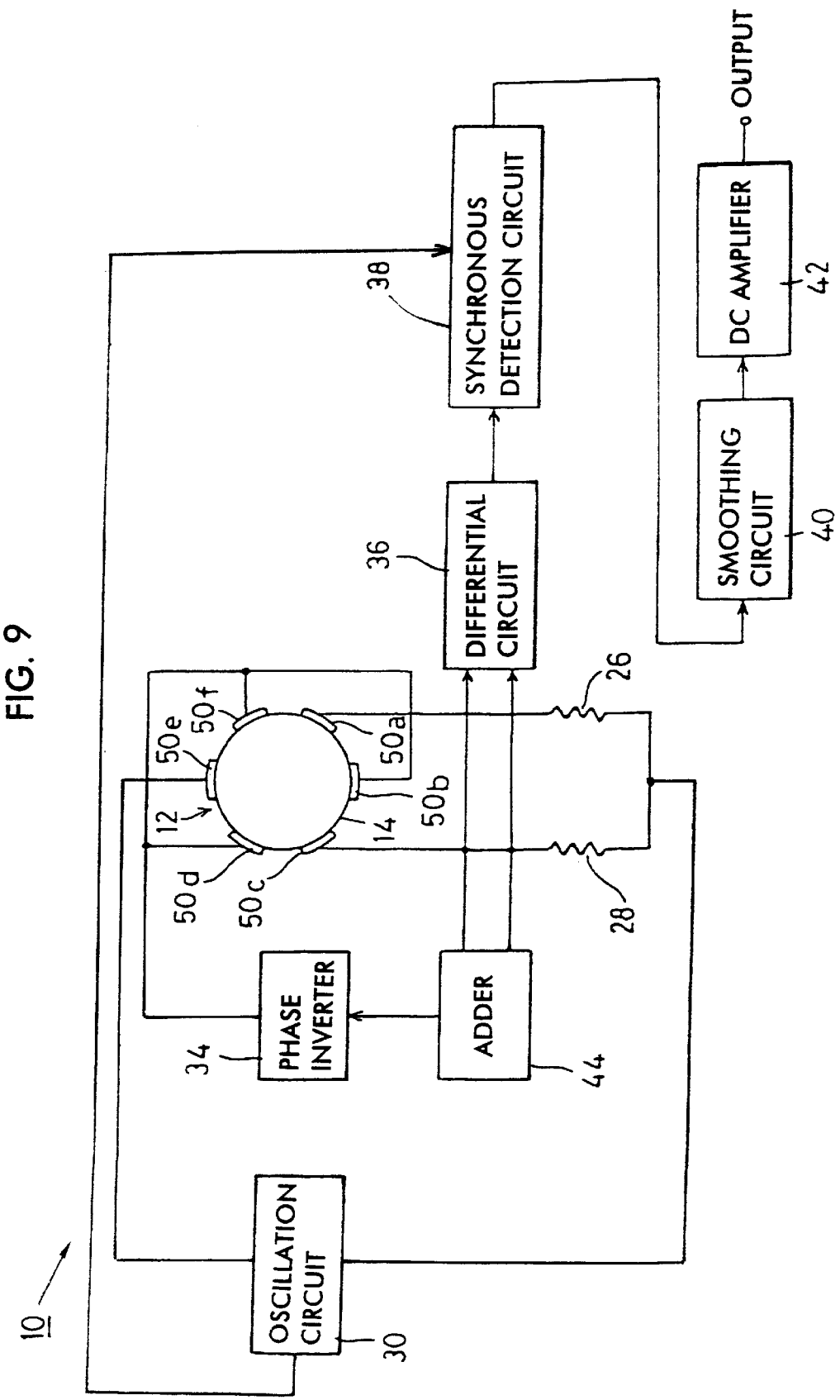
FIG. 9 is a diagram showing another vibration gyroscope using the vibrator shown in FIG. 6.
Figure 10:
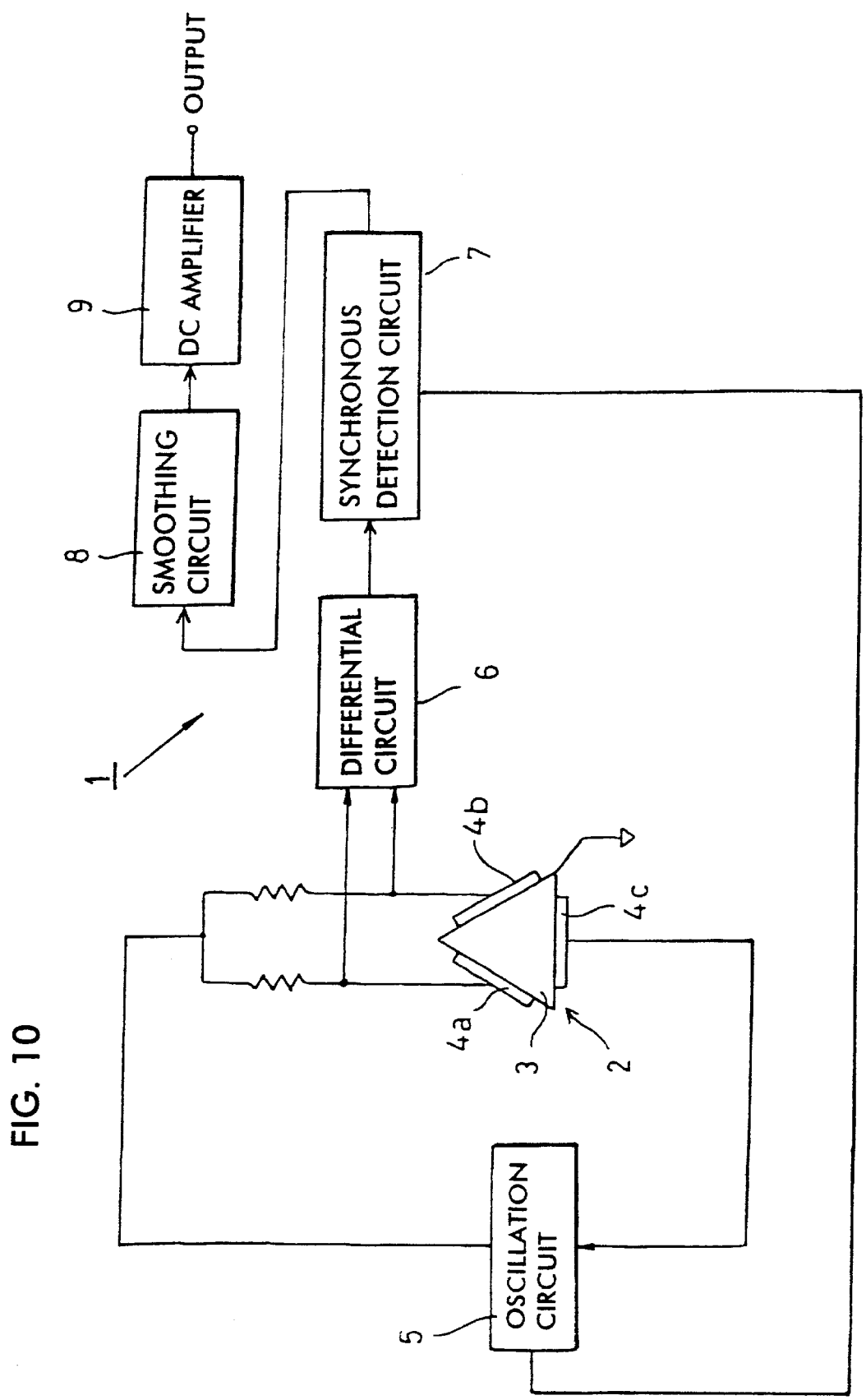
FIG. 10 is a diagram showing a conventional vibration gyroscope.

As shown in FIG. 8, this vibrator 12 may be configured such that the electrodes 50a and 50c are used as driving means and detection means, and the electrode 50e serves as feedback means. Also in this case, a rotation angular velocity can be detected in the same way as in trator 12 may also be configured as shown in FIG. 9 such that the electrodes 50a and 50c are used as feedback means and detection means, and the electrode 50e serves as driving means. In this case, a rotation angular velocity can also be detected in the same way as in the vibration gyroscope shown in FIG. 5.

Also in these vibration gyroscopes 10, the signal having a phase opposite that of the feedback signal is input to the electrodes 50b, 50d, and 50f serving as grounding terminals. A signal having a large voltage is applied between the feedback electrodes and the grounding electrodes, and the amplitude of the bending and vibration of the vibration member 14 can be made large. Therefore, a rotation angular velocity can be detected with higher sensitivity than in the conventional vibration gyroscope. Not only is the feedback signal inverted but it also may be amplified and input to the electrodes 50b, 50d, and 50f in these vibration gyroscopes. The amplitude of bending and vibration of the vibration member 14 can be made further large, and a more sensitive vibration gyroscope can be obtained.

The vibration member 14 may have another shape such as a quadrangular prism and a hexagonal prism. By applying a signal having a phase opposite that of the feedback signal to the grounding terminal of the vibrator, the amplitude of the vibration member can be made large, and a highly sensitive vibration gyroscope can be obtained.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A vibration gyroscope comprising:
   a vibration member;
   driving means on said vibration member for vibrating said vibration member;
   feedback means on said vibration member for generating a feedback signal based on a vibration of said vibration member, said feedback signal having an amplitude B;
   a circuit connected between said driving means and said feedback means for generating a driving signal based on said feedback signal and applying said driving signal to said driving means; and
   a phase inversion circuit for directly receiving the feedback signal without any modification of the amplitude or phase thereof and applying a signal having a phase opposite to that of the feedback signal to a grounding terminal to thereby apply a signal having an amplitude of 2B between said feedback means and said ground terminal.

2. A vibration gyroscope according to claim 1, wherein said driving means and said feedback means are formed by piezoelectric elements, and said vibration member is used as said grounding terminal.

3. A vibration gyroscope according to claim 1, wherein said vibration member is formed by a piezoelectric member, and said driving means, said feedback means, and said grounding terminal are formed on said vibration member as electrodes.

4. A vibration gyroscope according to claim 1, wherein said means for applying a signal having a phase opposite to that of the output signal from said feedback means includes a phase inverter.

5. A vibration gyroscope according to claim 4, wherein said means for applying a signal having a phase opposite to that of the output signal from said feedback means includes an amplifier intermediate said phase inverter and said grounding terminal.

6. A vibration gyroscope according to claim 1, wherein said vibration member has three side faces defining a triangular cross-sectional shape; said driving and feedback means includes first, second and third piezoelectric elements on said three faces, respectively; and said vibration member is used as said grounding terminal.

7. A vibration gyroscope according to claim 6, wherein said first piezoelectric element is used as said feedback means and said second and third piezoelectric elements are used as said driving means.

8. A vibration gyroscope according to claim 7, wherein said means for applying a signal having a phase opposite to that of the output signal from said feedback means includes a phase inverter.

9. A vibration gyroscope according to claim 8, wherein said means for applying a signal having a phase opposite to that of the output signal from said feedback means further includes an amplifier intermediate said phase inverter and said grounding terminal.

10. A vibration gyroscope according to claim 9, wherein the second and third piezoelectric elements provide respective output signals and further including a differential circuit connected to said second and third piezoelectric elements for detecting any difference in said output signals from said second and third piezoelectric elements.

11. A vibration gyroscope according to claim 10, further including a synchronous detection circuit connected to an output of said differential circuit; a smoothing circuit connected to an output of said synchronous detection circuit; and an amplifier connected to an output of said smoothing circuit.

12. A vibration gyroscope according to claim 11, wherein said circuit comprises an oscillation circuit.

13. A vibration gyroscope according to claim 12, wherein an output of said oscillation circuit is connected to an input of said synchronous detection circuit.

14. A vibration gyroscope according to claim 6, wherein said first piezoelectric element is used as said driving means and said second and third piezoelectric element are used as said feedback means.

15. A vibration gyroscope according to claim 14, further including an adder for adding signals from said second and third piezoelectric elements, the output of said adder being connected to said means for applying a signal having a phase opposite to that of the output signal from said feedback means.

16. A vibration gyroscope according to claim 15, wherein said means for applying a signal having a phase opposite to that of the output signal from said feedback means includes a phase inverter.

17. A vibration gyroscope according to claim 16, wherein said means for applying a signal having a phase opposite to that of the output signal from said feedback means further includes an amplifier intermediate said phase inverter and said grounding terminal.

18. A vibration gyroscope according to claim 17, wherein the second and third piezoelectric elements provide respective output signals and further including a differential circuit connected to said second and third piezoelectric elements for detecting any difference in said output signals from said second and third piezoelectric elements.

19. A vibration gyroscope according to claim 18, further including a synchronous detection circuit connected to an output of said differential circuit; a smoothing circuit connected to an output of said synchronous detection circuit; and an amplifier connected to an output of said smoothing circuit.

20. A vibration gyroscope according to claim 19, wherein said circuit comprises an oscillation circuit.

21. A vibration gyroscope according to claim 20, where an output of said oscillation circuit is connected to an input of said synchronous detection circuit.

22. A vibration gyroscope comprising:

a vibration member made of a conductive material and used as a grounding terminal;

a first piezoelectric element on said vibration member, for receiving a driving signal and vibrating said vibration member;

a second piezoelectric element on said vibration member, for generating a feedback signal based on a vibration of said vibration member, said feedback signal having an amplitude an oscillation circuit receiving said feedback signal and generating said driving signal based on said feedback signal; and a phase inversion circuit electrically connected directly between said second piezoelectric element and said vibration member for directly receiving said feedback signal from said second piezoelectric element without any modification of the amplitude or phase thereof, said phase inversion circuit inverting a phase of said feedback signal and applying a signal having said inverted phase to said vibration member to thereby apply a signal having an amplitude 2B between said second piezoelectric element and said vibration member.

23. A vibration gyroscope according to claim 22, wherein said second piezoelectric element vibrates said vibration member in response to a potential difference between said signal applied to said vibration member and said feedback signal.

24. A vibration gyroscope according to claim 23, further comprising a third piezoelectric element on said vibration member, said third piezoelectric element being electrically connected to said oscillation circuit in series with said first piezoelectric element.

25. A vibration gyroscope according to claim 24, further comprising a differential circuit connected to said first and third piezoelectric elements for detecting any difference of outputs from said first and second piezoelectric elements.

26. A vibration gyroscope according to claim 23, further comprising a third piezoelectric element on said vibration member, said third piezoelectric element being electrically connected to said phase inversion circuit in series with said second piezoelectric element.

27. A vibration gyroscope according to claim 26, further comprising a differential circuit connected to said third and second piezoelectric elements for detecting any difference of outputs from said first and second piezoelectric elements.

* * * * *